US012323735B2

(12) United States Patent
Su et al.

(10) Patent No.: US 12,323,735 B2
(45) Date of Patent: Jun. 3, 2025

(54) NETWORK BANDWIDTH DETERMINATION FOR ADAPTIVE WEB-CONFERENCE RENDERING AND TRANSMISSION

(71) Applicant: International Business Machines Corporation, Armonk, NY (US)

(72) Inventors: Jun Su, Beijing (CN); Peng Hui Jiang, Beijing (CN); Gang Tang, Nanjing (CN); Guang Han Sui, Beijing (CN); Yan Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 18/071,838

(22) Filed: Nov. 30, 2022

(65) Prior Publication Data

US 2024/0179271 A1    May 30, 2024

(51) Int. Cl.
*H04N 7/15*    (2006.01)
*H04L 12/18*    (2006.01)
*H04N 7/14*    (2006.01)

(52) U.S. Cl.
CPC ......... *H04N 7/152* (2013.01); *H04L 12/1822* (2013.01); *H04L 12/1827* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 5,884,262 A | * | 3/1999 | Wise ............... H04M 3/493 704/271 |
| 9,954,650 B2 | | 4/2018 | Tabet et al. |
| 10,581,625 B1 | | 3/2020 | Pandey et al. |
| 11,127,431 B2 | | 9/2021 | Svendsen et al. |
| 2003/0120489 A1 | | 6/2003 | Krasnansky et al. |
| 2008/0295040 A1 | | 11/2008 | Crinon |

(Continued)

OTHER PUBLICATIONS

Labonne, Maxime, et al., "Predicting Bandwidth Utilization on Network Links Using Machine Learning," 2020 European Conference on Networks and Communications (EuCNC), Jun. 15, 2020.

*Primary Examiner* — Duc Nguyen
*Assistant Examiner* — Assad Mohammed
(74) *Attorney, Agent, or Firm* — Rakesh Roy

(57) ABSTRACT

A method for transmitting web-conference content over a network connection is disclosed. In one embodiment, such a method conducts a web conference over a network connection. The method monitors characteristics of the network connection in order to determine bandwidth of the network connection during the web conference. The method implements, on the network connection, a "raw" mode wherein audio data of the web conference is transmitted over the network connection in an original format. Upon detecting a low bandwidth condition on the network connection, the method toggles from the "raw" mode to a "saving" mode where audio data of the web conference is converted to text at a first end of the network connection, transmitted over the network connection as text, and converted from text back to audio data at a second end of the network connection. A corresponding system and computer program product are also disclosed.

20 Claims, 11 Drawing Sheets

(56) References Cited

U.S. PATENT DOCUMENTS

| | | | |
|---|---|---|---|
| 2014/0214426 A1* | 7/2014 | Kanevsky | ............... G10L 15/08 |
| | | | 704/251 |
| 2016/0301729 A1* | 10/2016 | Gurevich | .............. H04L 65/764 |
| 2016/0301770 A1 | 10/2016 | Marra et al. | |
| 2018/0218727 A1* | 8/2018 | Cutler | ..................... G10L 13/04 |
| 2019/0230319 A1 | 7/2019 | Gero et al. | |
| 2021/0184979 A1 | 6/2021 | Jana et al. | |
| 2021/0185276 A1 | 6/2021 | Peters et al. | |
| 2021/0377587 A1* | 12/2021 | Ekanayake | ............ H04N 7/142 |

* cited by examiner

| Parameter | Values | Distribution |
|---|---|---|
| Protocol | TCP, UDP | Uniform |
| Bitrate | Average: 2Mbps<br>Std: 500kbps | Normal |
| Flow Duration | [30, 500] seconds | Uniform |
| Packet Length | [200, 1472] bytes | Uniform |
| Flow Inter-Arrival Time | [20, 2000] seconds | Uniform |
| Source/Destination Couple | IP of the End Hosts | Uniform |
| Server Port | [5001, 5500] | Uniform |

Fig. 7

NETWORK BANDWIDTH DETERMINATION FOR ADAPTIVE WEB-CONFERENCE RENDERING AND TRANSMISSION

BACKGROUND

Field of the Invention

This invention relates to systems and methods for determining network bandwidth to dynamically adjust web-conference rendering and transmission.

Background of the Invention

When conducting a web conference, a wide variety of people in different locales and with different client devices (e.g., personal computers, laptops, tablets, smart phones, etc.) and internet connections may attend. In many cases, not all meeting attendees will have high-speed internet connections to attend a web conference. For example, in rural areas, which often rely on wireless internet service, data transmission speeds may be much slower than those in wired service areas. The result is that different attendees may have very different experiences when attending a web conference. That is, different attendees may experience different levels of quality in terms of receiving or sending audio, video, and data when participating in a web conference.

Although various different techniques may be used to address temporarily or persistently low bandwidth when attending a web conference, these techniques are typically not dynamic and in some cases may provide an unacceptable user experience. For example, an attendee may turn off incoming video, reduce the resolution of a screen on which the web conference is being viewed, or reduce animation effects such as motion effects to address low bandwidth conditions. These techniques may unfortunately provide a lower quality experience than what is desired.

SUMMARY

The invention has been developed in response to the present state of the art and, in particular, in response to the problems and needs in the art that have not yet been fully solved by currently available systems and methods. Accordingly, systems and methods have been developed to dynamically adjust web-conference rendering and transmission in accordance with participants bandwidth. The features and advantages of the invention will become more fully apparent from the following description and appended claims, or may be learned by practice of the invention as set forth hereinafter.

Consistent with the foregoing, a method for transmitting web-conference content over a network connection is disclosed. In one embodiment, such a method conducts a web conference over a network connection. The method monitors characteristics of the network connection in order to determine bandwidth of the network connection during the web conference. The method implements, on the network connection, a "raw" mode wherein audio data of the web conference is transmitted over the network connection in an original format. Upon detecting a low bandwidth condition on the network connection, the method toggles from the "raw" mode to a "saving" mode where audio data of the web conference is converted to text at a first end of the network connection, transmitted over the network connection as text, and converted from text back to audio data at a second end of the network connection.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 7 is a table showing various network characteristics that may be utilized by a prediction module in accordance with the invention;

DETAILED DESCRIPTION

Figure 1:
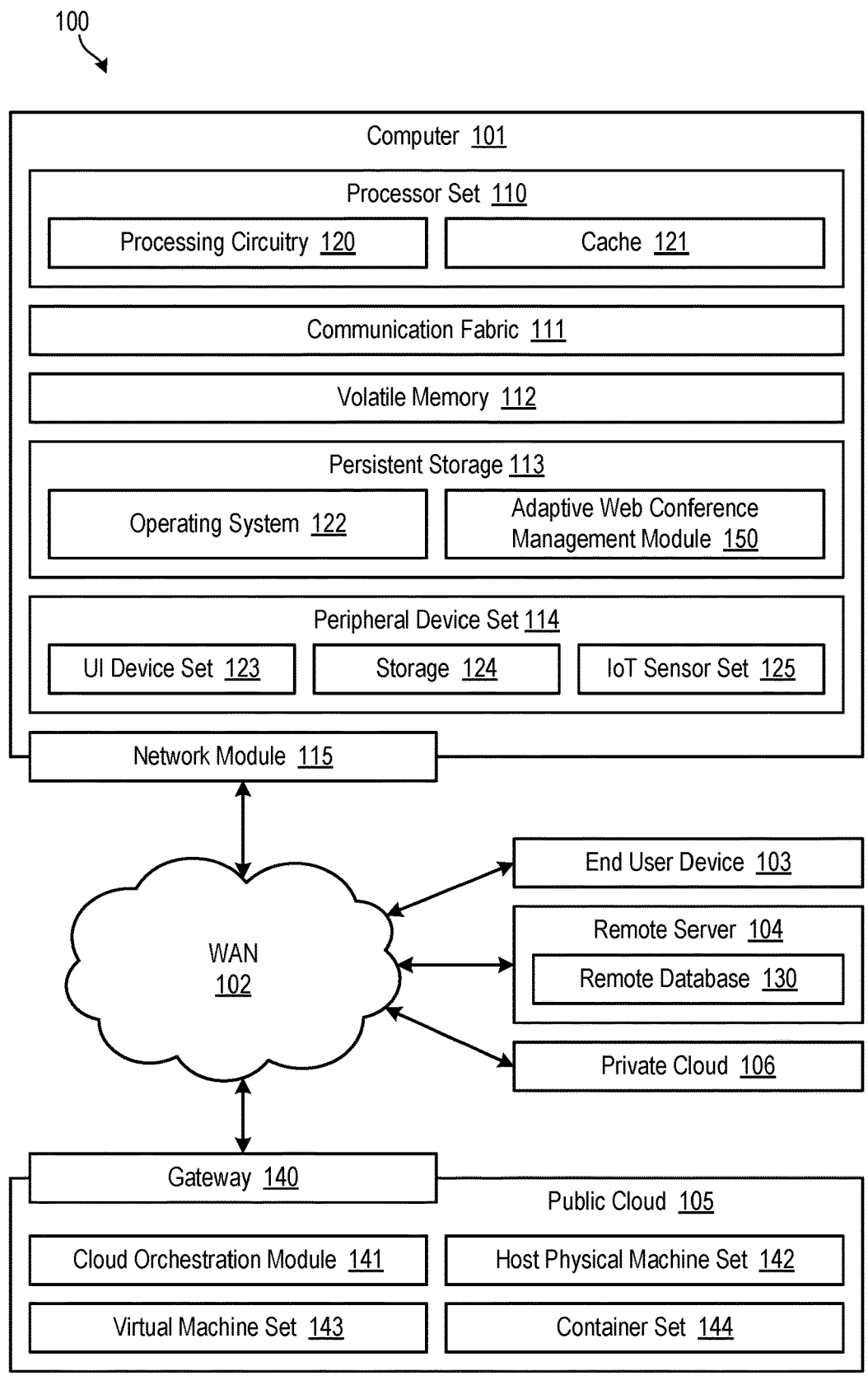
FIG. 1 is a high-level block diagram showing one example of a computing system for use in implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 (i.e., an "adaptive web conference management module 150") for predicting network bandwidth to dynamically adjust web-conference transmission and rendering. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
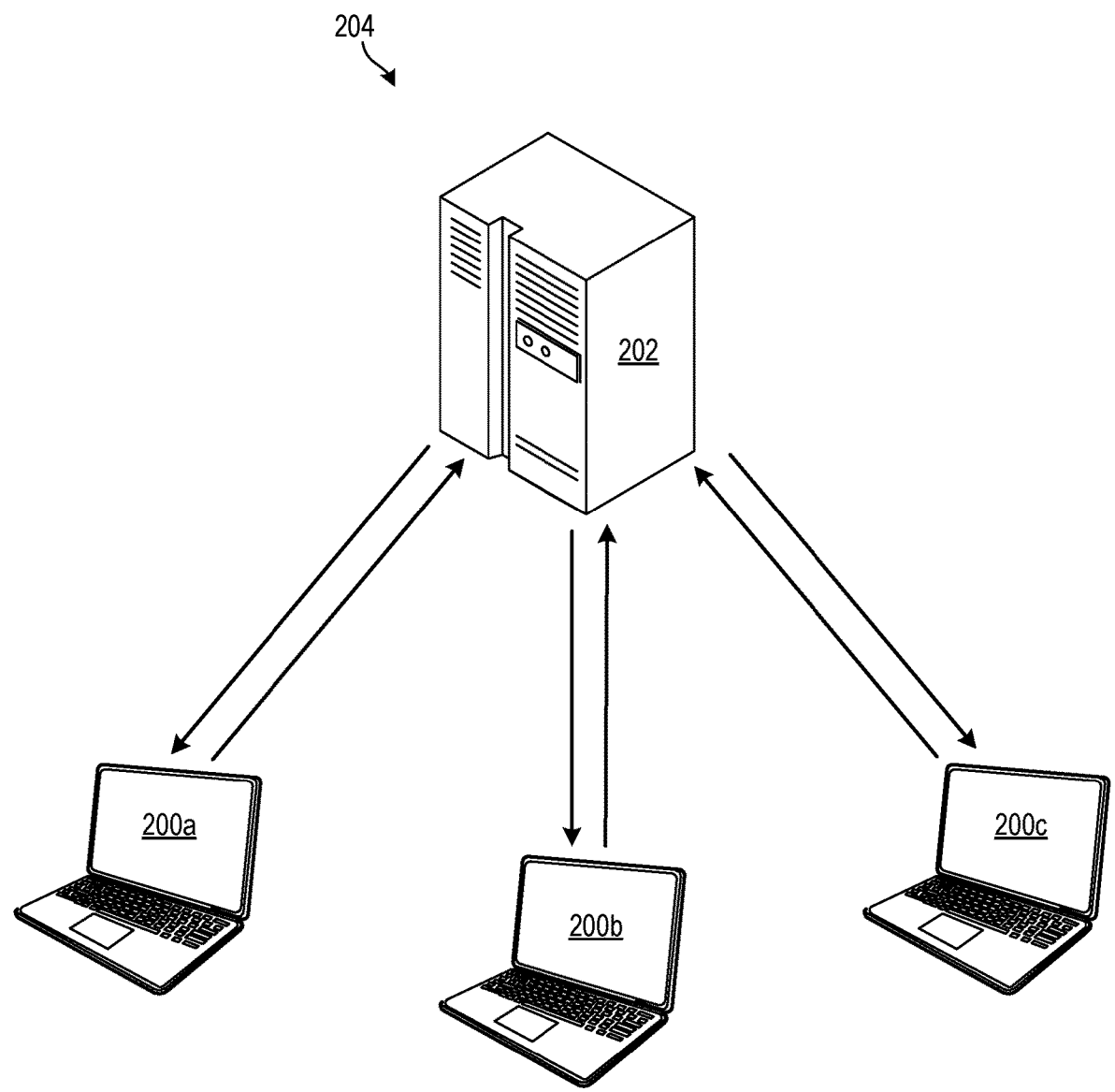
FIG. 2 is a high-level block diagram showing one example of a network topology in which an adaptive web conference management module in accordance with the invention may be implemented.

Referring to FIG. 2, as previously mentioned, when conducting a web conference, a wide variety of people in different locales and with different client devices 200*a-c* (e.g., personal computers, laptops, tablets, smart phones, etc.) and internet connections may attend. In most cases, not all meeting attendees will have high-speed internet connections to attend a web conference. For example, in rural areas, which often rely on wireless internet service, data transmission speeds may be much slower than those in wired service areas. The end result is that different attendees may have very different experiences when attending a web conference. That is, different attendees may experience different levels of quality in terms of receiving or sending audio, video, and data when participating in a web conference.

Although various different techniques may be used to address temporarily or persistently low bandwidth when attending a web conference, these techniques are typically not dynamic and in some cases may provide an unacceptable user experience. For example, an attendee may turn off incoming video, reduce the resolution of a screen on which a web conference is being viewed, or reduce animation effects such as motion effects to address low bandwidth conditions. These techniques may unfortunately provide a lower quality experience than what is desired.

To address the issues identified above, an adaptive web conference management module 150 may be provided to improve participants' web conference experience even under low bandwidth conditions. FIG. 2 shows one example of a network topology in which an adaptive web conference management module 150 in accordance with the invention may be implemented. In this particular topology, various client devices 200*a-c* communicate with a server 202 in a star-type topology. Nevertheless, this topology is simply an example and is not intended to be limiting. Other types of network topologies (e.g., ring topologies, tree topologies, mesh topologies, bus topologies, and hybrids thereof) may also be used with an adaptive web conference management module 150 in accordance with the invention.

In certain embodiments, web conference server software may run on the server and web conference client software may run on the client devices 200*a-c* to facilitate conducting the web conference. Each of the client devices 200*a-c* may communicate with the server 202 over a respective network connection, with each network connection having a bandwidth speed and other characteristics, some of which may change over time. Because of the differences in the network connections, each of the client devices 200*a-c* may experience the web conference with a different quality.

In certain embodiments in accordance with the invention, an adaptive web conference management module 150 may be implemented on the network 204 to provide a better quality web conference experience for most or all participants to the web conference under different bandwidth conditions, and primarily for participants having low bandwidth on a permanent or temporary basis. In general, the adaptive web conference management module 150 may be configured to determine and/or predict bandwidth on the network connections and adaptively switch between different rendering and transmission approaches to mitigate low bandwidth conditions. This will ideally improve the audio and/or visual quality of the web conference for participants having low bandwidth network connections, even if the low bandwidth conditions are only temporary.

Figure 3:
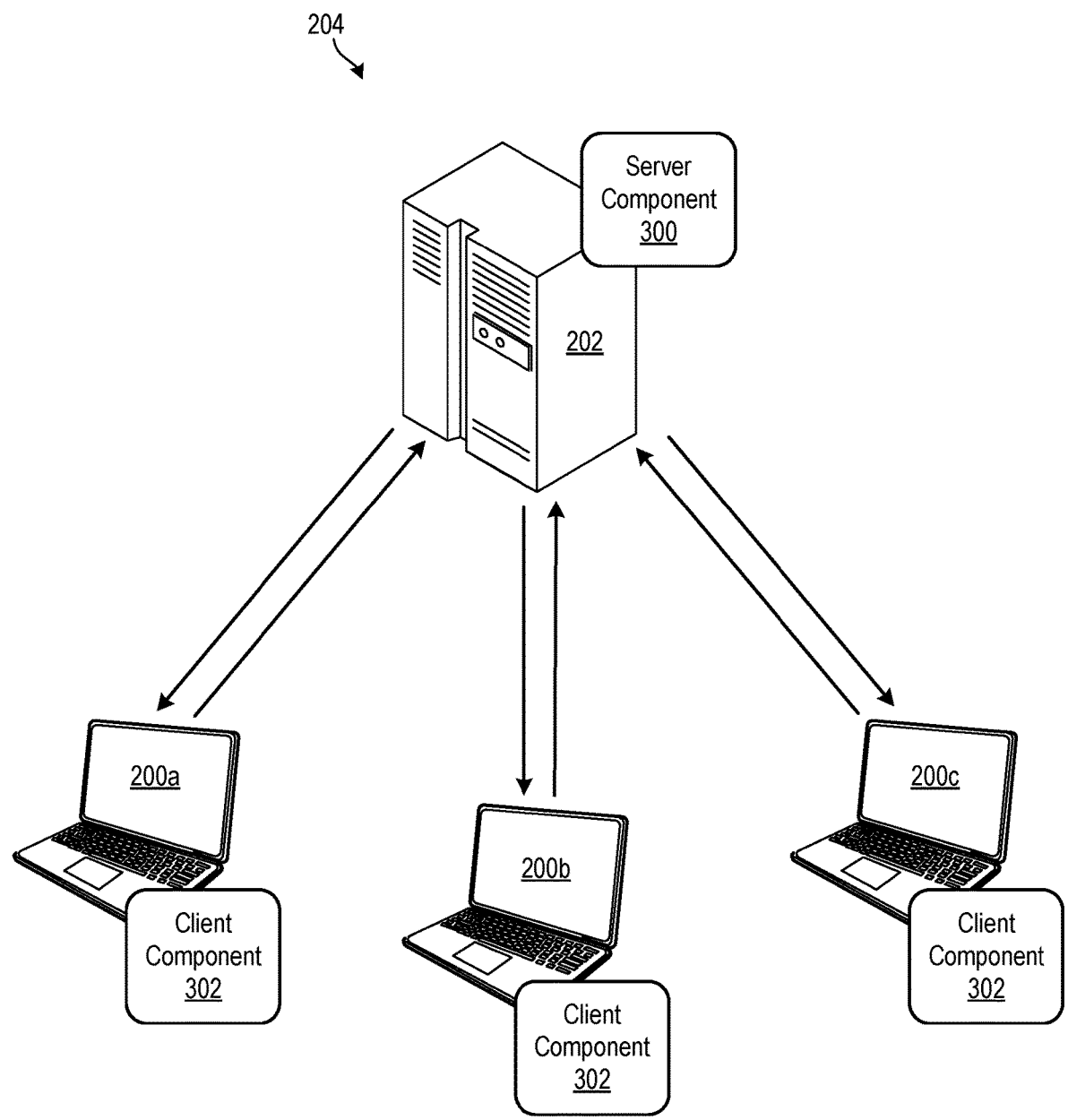
FIG. 3 is a high-level block diagram showing various components that may be used in association with an adaptive web conference management module in accordance with the invention.

In order to implement the adaptive web conference management module 150, various types of functionality may be incorporated into the network 204. For example, as shown in FIG. 3, in certain embodiments, the adaptive web conference management module 150 may include a server component 300 on the web conferencing server 202 and client components 302 on the client devices 200*a-c*. The function of the server component 300 and the client components 302 will be discussed in more detail in association with FIGS. 4 and 5.

Figure 4:
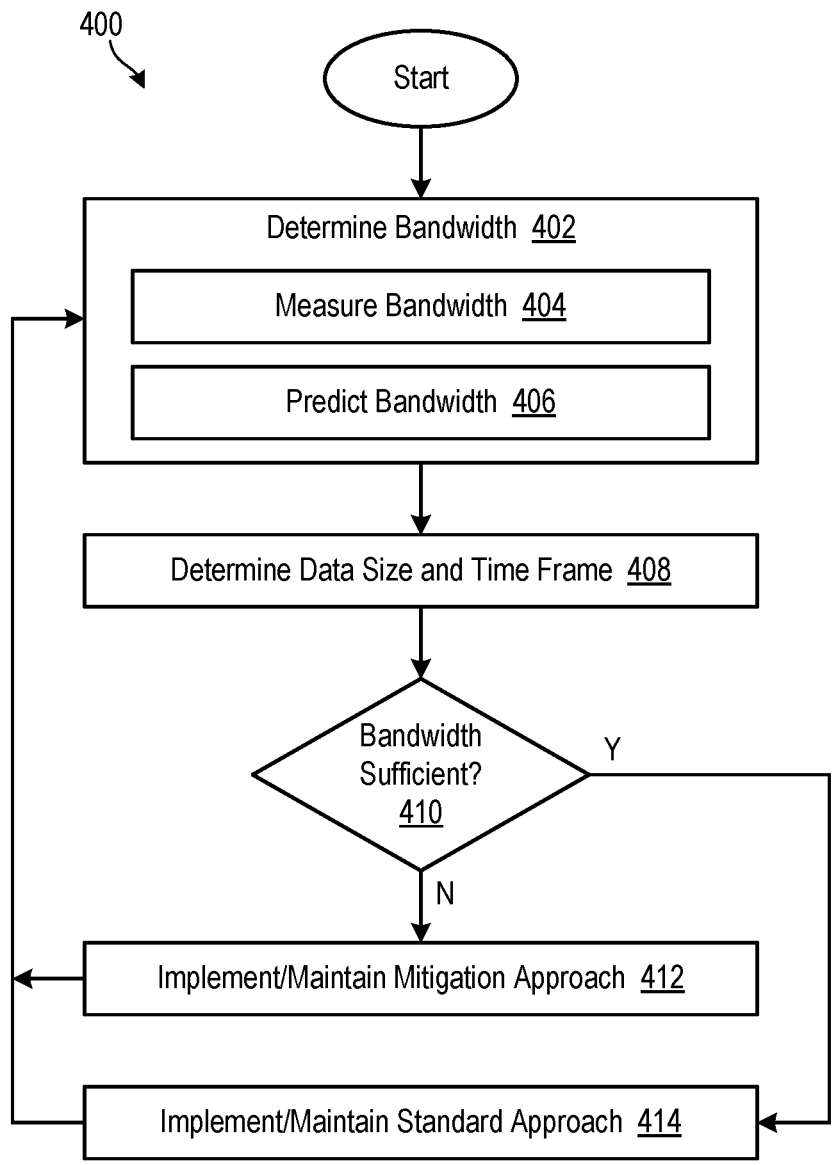
FIG. 4 is a process flow diagram showing one embodiment of a method that may be executed by the server component and/or client component.

Referring to FIG. 4, a process flow diagram showing one embodiment of a method 400 that may be implemented by the server component 300 and/or client component 302 is illustrated. As shown, in certain embodiments, when conducting a web conference, the method 400 may dynamically and in real time determine the 402 the bandwidth that is available on a network connection between a server 202 and client device 200, or between multiple client devices 200*a-c*. This may be performed for each network connection participating in the web conference since each participant and associated network connection may be different. In certain embodiments, this may be accomplished by directly measuring 404 the bandwidth of each network connection with a "bandwidth probe" or other functionality.

For example, a bandwidth probe may be provided in the application layer to detect the bandwidth of the network connection and potentially a low bandwidth condition. In certain embodiments, before the bandwidth is known or measured, a network connection may begin operating in a "raw" mode wherein audio information of the web conference is transmitted over the network connection in an original format. While operating in this "raw mode," the bandwidth probe may monitor how much data is passed from an underlying TCP socked for a specified time window.

In certain embodiments, this may be performed in an application's data sending API layer. The amount of unsent data in a socket send queue at the end of a time window may also be collected via an IOCTL system-call with a SIOCOUTQ flag. The bandwidth probe may then calculate a required sending bandwidth (i.e., using a size of data passed to the socket divided by size of the time window) and a sending queue size for the time window. If the required sending bandwidth is flat or even decreases while the sending queue is increasing, this may be a sign of insufficient bandwidth. In short, the bandwidth probe may evaluate a required sending bandwidth and a pending data size to determine whether bandwidth on the network connection is sufficient to transmit the data in an original format.

In certain embodiments, determining 402 the bandwidth may also include predicting 406 the bandwidth based on past historical performance of a network connection. This prediction may be performed to enhance the method 400 and to determine which web conference rendering and transmission method is best for participants to have an uninterrupted user experience. As will be explained in more detail hereafter, the method 400 may be enhanced by artificial intelligence and more specifically machine learning to analyze, predict, and recommend a best web conference rendering and transmission approach for each participant in the web conference.

Once the bandwidth of a network connection is determined 402, the method 400 may determine 408 a size of data that needs to be transmitted over the network connection and the time frame or window over which the data needs to be transmitted. The method 400 may then determine 410 whether the bandwidth determined at step 402 is sufficient to transmit the data in the time frame or window. If so, the method 400 implements or maintains a standard approach to transmitting the web conference content. For example, the standard approach may be utilizing the "raw" mode described above wherein audio information of the web conference content is transmitted over the network connection in an original format.

If, at step 410, the bandwidth is not sufficient to transmit the data, the method 400 may implement or maintain (if already in use) a mitigation approach to render and transmit web conference content. For example, the mitigation approach may include utilizing a "saving" mode wherein audio data of a web conference is converted to text at a first end of the network connection, transmitted over the network connection as text, and then converted from text back to audio data at a second end of the network connection for playing to a participant. Transmitting the web conference content over the network connection in the form of text may require significantly less bandwidth than transmitting audio data over the network connection in its original unconverted format.

As shown, the method 400 may repeat since the bandwidth on a network connection, as well as the size or amount of data that is being transmitted over the network connection, may be in a constant state of flux or change. In certain embodiments, low bandwidth observed on a network connection may be transitory. Thus, in certain embodiments, the method 400 repeats to constantly update the best rendering and transmission approach for each network connection under its current circumstances. In certain cases, the method 400 dynamically toggles between "raw" mode and "saving" mode as needed to efficiently utilize available bandwidth and provide participants with the best user experience possible under the conditions.

It should also be noted that the determination of bandwidth may be bi-directional. That is the bandwidth in one direction on a network connection may be considered separately from the bandwidth in the other direction. As an example, a low bandwidth condition may be detected in one direction on the network connection while the bandwidth may be considered normal or sufficient in the other direction. Thus, it is possible that a network connection may be operating in "saving" mode in one direction and "raw" mode in the opposite direction to ensure that web conference participants are provided with the best user experience possible under the conditions.

Figure 5:
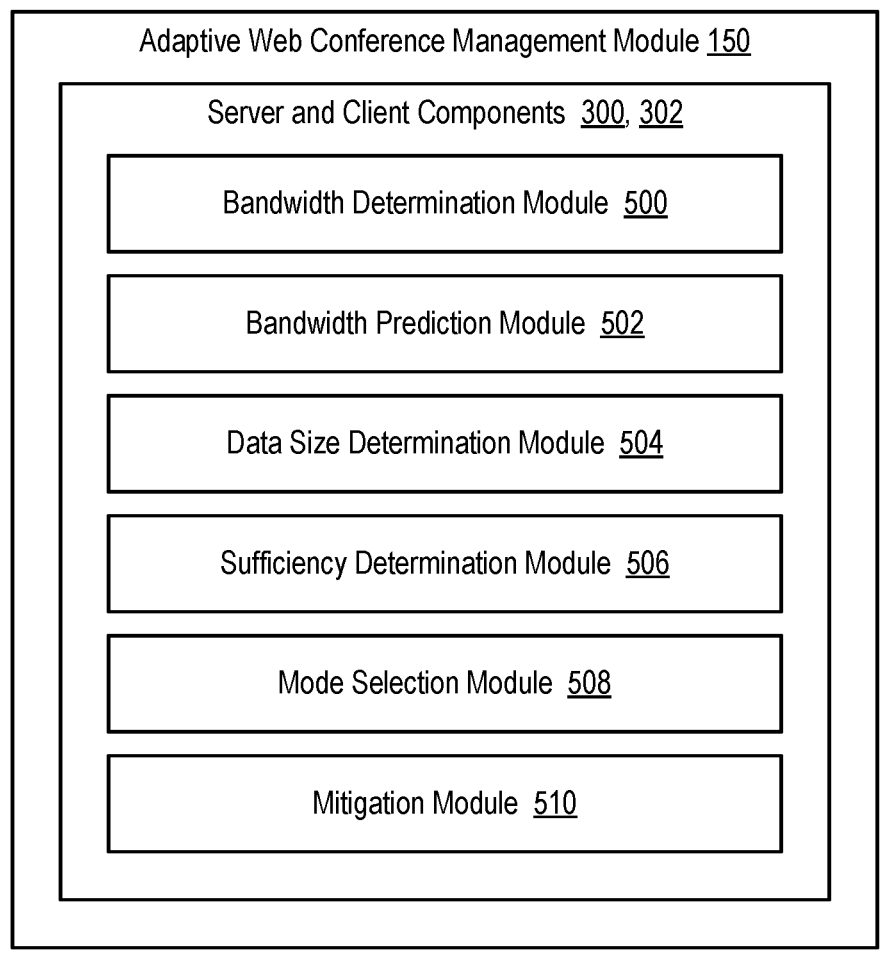
FIG. 5 is a high-level block diagram showing various modules that may be provided to implement the method of FIG. 4.

FIG. 5 shows various modules that may be provided in the server component 300 and/or client component 302 to implement the method 400 illustrated in FIG. 5. These modules may be implemented in hardware, software, firmware, or combinations thereof. These modules are presented by way of example and not limitation. More or fewer modules may be provided in different embodiments. For example, the functionality of some modules may be combined into a single or smaller number of modules, or the functionality of a single module may be distributed across several modules.

As shown, in certain embodiments, the adaptive web conference management module 150, and more specifically the server component 300 and/or client component 302 of the adaptive web conference management module 150, may include one or more of a bandwidth determination module 500, bandwidth prediction module 502, data size determination module 504, sufficiency determination module 506, mode selection module 508, and mitigation module 510. In certain embodiments, the bandwidth prediction module 502 is not included in the client component 302 since this may require more processing power than is available in the client devices 200a-c, or could possibly slow down the client devices 200a-c more than is desired.

The bandwidth determination module 500 may be configured to determine the bandwidth of a network connection, such as in real time as a web conference is occurring. In certain embodiments, a bandwidth probe or other similar functionality as was previously described may assist with this function. The bandwidth prediction module 502, by contrast, may be used to predict the bandwidth of a particular network connection. In certain embodiments, the bandwidth prediction module 502 may utilize artificial intelligence and more specifically machine learning to analyze historical data regarding the network connection, and use this knowledge to predict the bandwidth of a particular network connection presently or at a future point in time. In certain embodiments, the bandwidth prediction module 502 may be used to augment or enhance the function of the bandwidth determination module 500 in determining the bandwidth of a particular network connection and the mode in which it should operate.

Once the bandwidth of a network connection is determined, the data size determination module 504 may determine the size of data that needs to be transmitted over the network connection and the window or time frame in which it needs to be transmitted. In certain embodiments, this size corresponds to the data in its original format. Once the bandwidth of the network connection and the size of the data is determined, the sufficiency determination module 506 may determine whether the available bandwidth is sufficient to accommodate the data. If so, the mode selection module 508 may select a mode of rendering and transmission that is suitable for rendering and transmitting the data over the network connection. For example, the mode selection module 508 may select the "raw" mode, as previously discussed, to render and transmit the data. In the event the available bandwidth is not sufficient to render and transmit the data in its original format, the mitigation module 510 may select a mitigation approach for rendering and transmitting the data. For example, the mitigation module 510 may select the "saving" mode as previously discussed for rendering the transmitting the data. Mitigation approaches may include, among others, "text-to-speech," "speech-to-text," "multiple speeds of rending streams" (e.g., the host and audience communicate asynchronously based on bandwidth of the network connections), "multiple tracks" (e.g., web conference content may be divided into multiple tracks, including video, audio, text, with each potentially being rendered in a different way), and the like.

Figure 6:
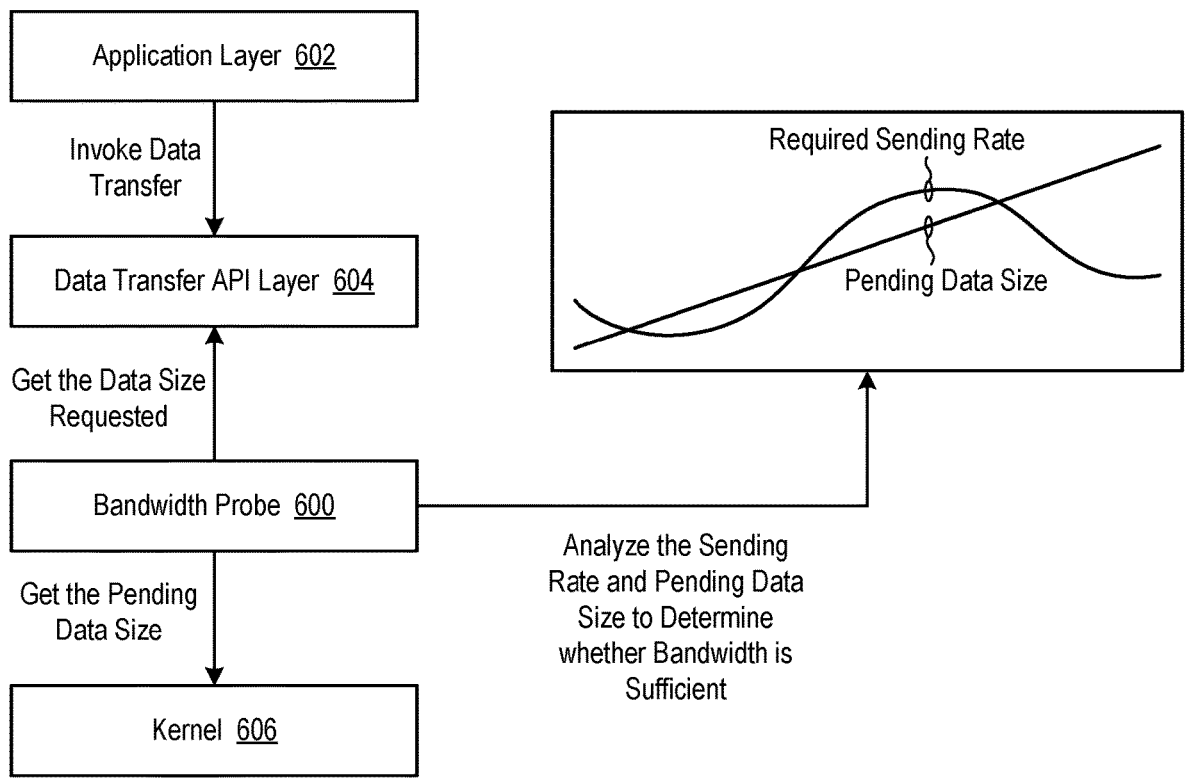
FIG. 6 is a high-level block diagram showing operation of a bandwidth probe.

Referring to FIG. 6, a high-level block diagram showing possible operation of the "bandwidth probe" is illustrated. As shown, a bandwidth probe 600 may be provided in the application layer 602 to detect the bandwidth of a network connection and potentially a low bandwidth condition. In certain embodiments, before the bandwidth is known or measured, a network connection may begin operating in "raw" mode wherein audio information of the web conference content is rendered and transmitted over the network connection in an original format. While operating in this "raw mode," the bandwidth probe 600 may monitor how much data has been passed from an underlying TCP socket for a specified time window. This may, in certain embodiments, be performed in an application's data sending API layer. The amount of unsent data in a socket send queue at the end of a time window may also be collected via an IOCTL system-call with a SIOCOUTQ flag. The bandwidth probe 600 may then calculate a required sending bandwidth (i.e., using a size of data passed to the socket divided by size of the time window) and a sending queue size for the time window. If the required sending bandwidth is flat or even decreases while the sending queue is increasing, this may be a sign of insufficient bandwidth. In such cases, the mitigation module 510 may transition to the "saving" mode. While operating in the "saving" mode, the bandwidth probe 600 may monitor the sending bandwidth and the sending queue size. If the sending queue can be drained quickly, this may be an indication of sufficient bandwidth. In such cases, the application may switch back to "raw" mode.

Referring to FIG. 7, as previously mentioned, the adaptive web conference management module 150 and more particularly the bandwidth prediction module 502 may be configured to predict bandwidth of network connections participating in a web conference. In certain embodiments, the bandwidth prediction module 502 may utilize artificial intelligence and more particularly machine learning to analyze historical data regarding the network connection, and use this knowledge to predict the bandwidth of a particular network connection presently or at a future point in time.

FIG. 7 shows various types of historical information that may be collected for the network connections in order to train the bandwidth prediction module 502. These are provided by way of example and not limitation. The bitrate, flow duration, and flow inter-arrival time intervals may be selected so that maximum capacity is reached on certain or all network connections, even for a short period of time. In other words, data ranging from zero traffic to maximum capacity may be utilized. The parameters and values may be used not only to train the artificial intelligence, but also to test the artificial intelligence once it is trained to ascertain the accuracy of the artificial intelligence. Similarly, the parameters and values may also be gathered and used in the real world when using the artificial intelligence to predict the bandwidth of an actual network connection.

Figure 8:
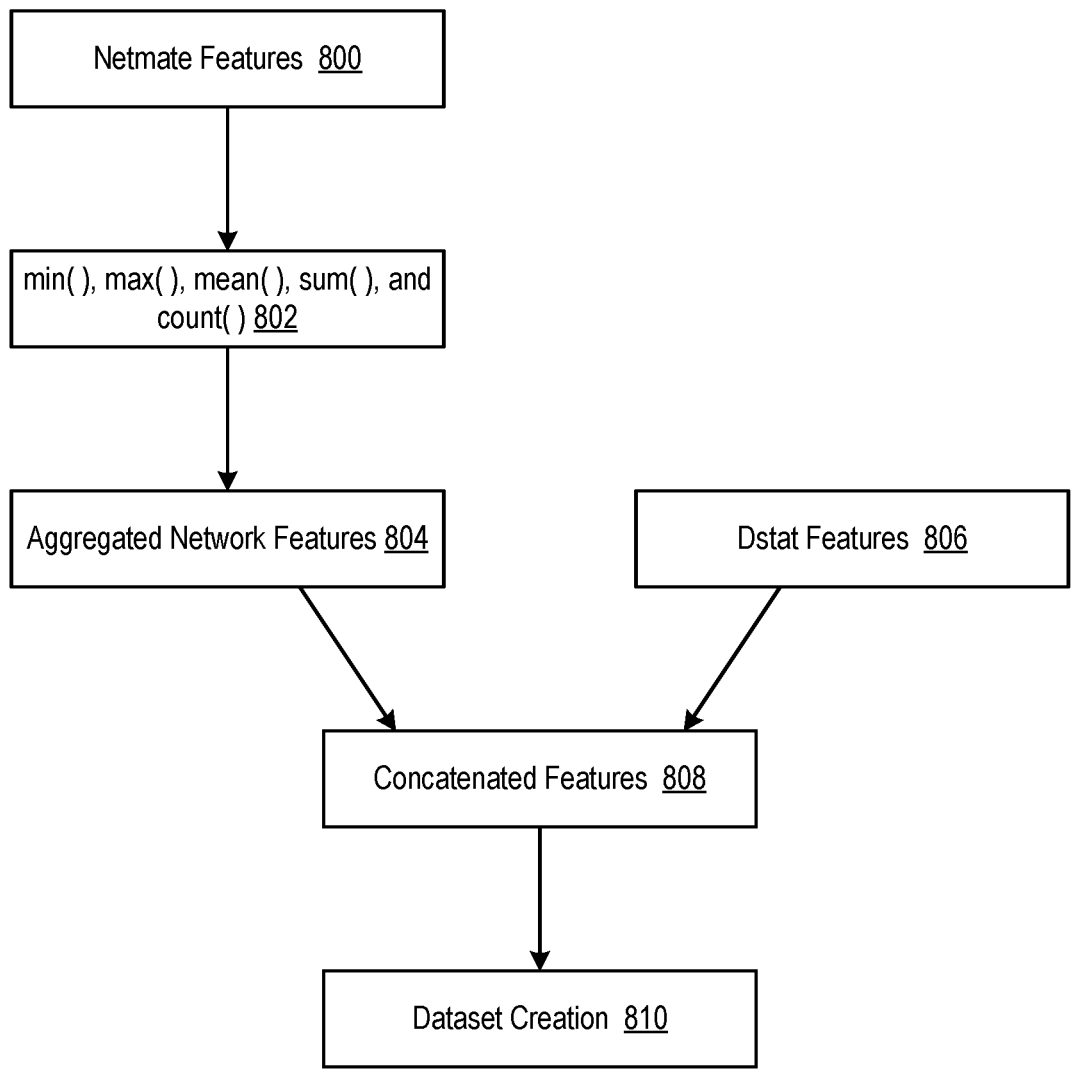
FIG. 8 is a high-level block diagram showing a preprocessing phase to create datasets in a format suitable for machine learning algorithms used by the bandwidth prediction module.

Referring to FIG. 8, in certain embodiments, various types of tools may be used to obtain information on the bandwidth of the network connections. For example, in certain embodiments, the tools Netmate and Dstat may be used to gather information on the network connections that may be used to train the machine learning algorithms of the bandwidth prediction module 502. Specifically, Netmate (Network Measuring and Accounting Meter) is a network measurement tool capable of collecting various types of network statistics, such as packet volumes and sizes, packet inter-arrival times, and flow durations. Dstat, by contrast, is a Linux tool that can generate system resource statistics from different system components such as CPU, RAM, I/O devices, networks connections and interfaces, and the like.

Data from Netmate and Dstat may be preprocessed in order to create 810 datasets that are suitable for processing by machine learning algorithms. Because Netmate generates statistics for every active flow, a feature engineering procedure may be used to create 804 new features that describe a status of a network connection collectively. Mathematical functions such as min( ), max( ), mean( ), sum( ) and count( ) may be applied 802 to the Netmate data to obtain new features. The Netmate features 804 may then be concatenated 808 with the features 806 from the Dstat tool using a timestamp to synchronize values from the two tools. After this feature engineering step, the concatenated features may be collected from each interface of each network connection over each time interval (e.g., every three seconds).

A dataset 810 may then be created for the machine learning algorithm training process. In certain embodiments, two important features from Dstat, namely the download bitrate and upload bitrate, may be used to predict network connection usage. A new feature referred to as the maximum bitrate may be created by choosing a maximum of these two values and dividing it by a nominal maximum capacity of the network connection (e.g., 100 Mbps). This new column may provide a network connection usage ratio, either in an uplink or downlink direction. The maximum bitrate column may then be duplicated to create a future bitrate column, which may be shifted forward by an offset value. Machine learning algorithms may be trained to predict this future bitrate, namely the future maximum bitrate of the network connection.

Figure 9:
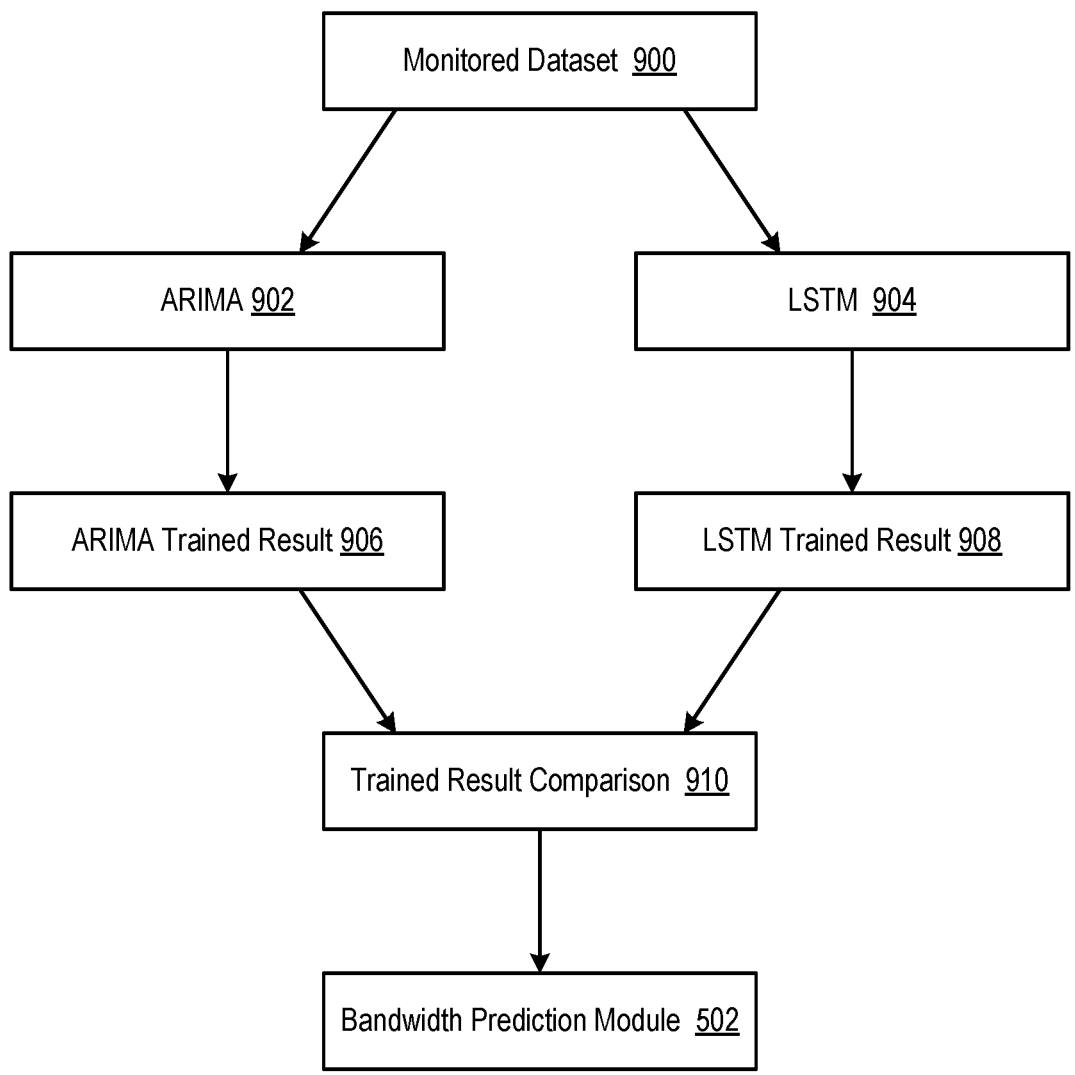
FIG. 9 is a high-level block diagram showing various machine learning algorithms that may be used by the bandwidth prediction module.
Figure 10:
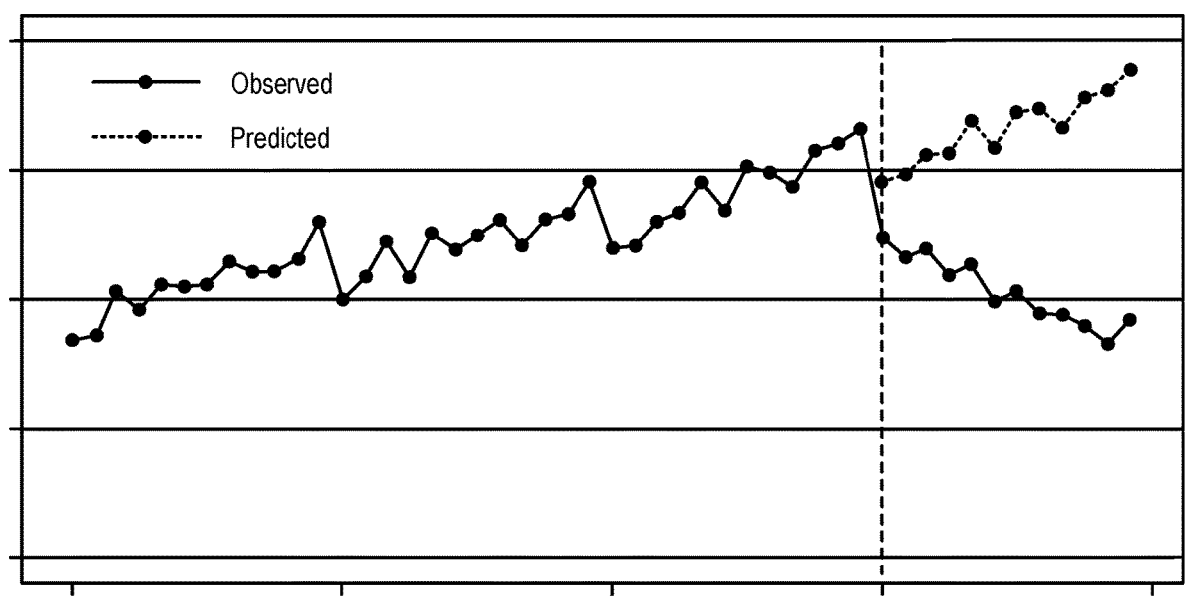
FIG. 10 is a plot showing evaluation of the machine learning algorithms described in association with FIG. 9.

Referring to FIG. 9, as mentioned, various machine learning algorithms may be trained using the training data dataset 810 disclosed in FIG. 8. For example, Autoregressive Integrated Moving Average (ARIMA) and Long Short-Term Memory network (LSTM) are two machine learning algorithms that may be trained using the dataset 810 described in FIG. 8. Once these machine learning algorithms 902, 904 are trained, they may be tested with a monitored dataset 900 to predict bandwidth of various network connections. These machine learning algorithms 902, 904 may yield the trained results 906, 908 from the test data. In certain embodiments, these trained results 906, 908 may be compared 910 to determine which trained result was more accurate. In certain embodiments, this may be accomplished by comparing real-world observations or results with the predictions of the machine learning algorithm, as shown in FIG. 10. In certain embodiments, the most accurate machine learning algorithm may then be used in the bandwidth prediction module 502 to predict the bandwidth of actual network connections.

Figure 11:
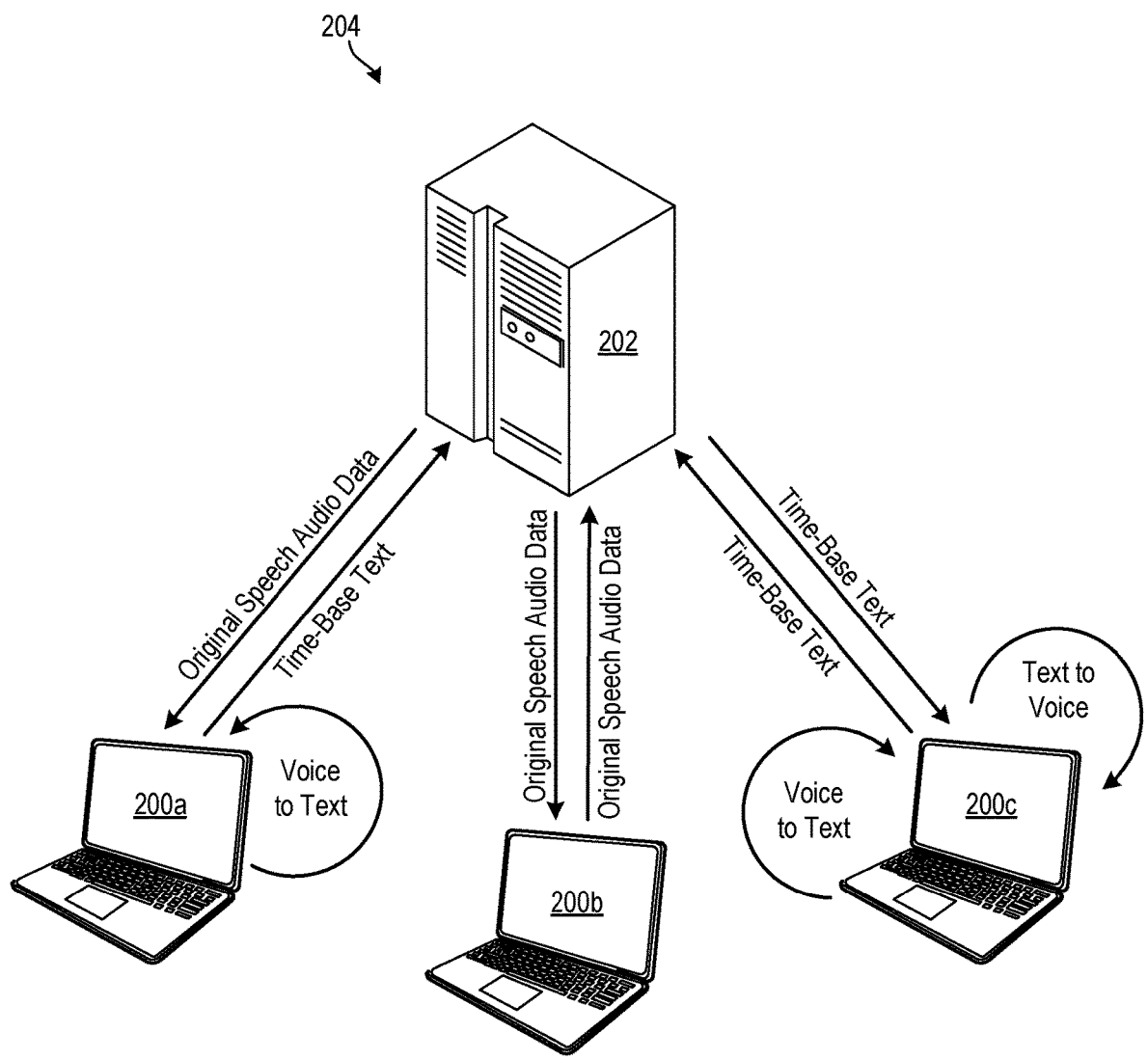
FIG. 11 is a high-level block diagram showing various rendering and transmission modes that may be used on network connections of participants of a web conference.

Referring to FIG. 11, as previously mentioned, each network connection in the network environment may be bi-directional. Thus, the bandwidth in one direction on a network connection may be considered separately from the bandwidth in the other direction. It follows that the mode of rendering and transmitting data in one direction on the network connection may, in certain situations, differ from the mode used in the opposite direction. Also, different network connections may use different rendering and transmission modes depending on the bandwidth detected or predicted thereon. FIG. 11 shows an example where a first client device 200a receives voice data in an original format but transmits voice data as text in the opposition direction after converting the voice data from an original format to text. A second client device 200b, by contrast, may receive and transmit voice data in both direction in an original format. A third client device 200c may receive and transmit voice data in both directions in text format. When the third client device 200c receives the text data, the third client device 200c may convert the text to audio. Similarly, before the third client device 200c transmits the text data, the third client device 200c may convert the audio data to text.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for transmitting web-conference content over a network connection, the method comprising:
conducting a web conference over a network connection;
implementing, over the network connection, a "raw" mode wherein audio data of the web conference is transmitted over the network connection in an original format;
monitoring characteristics of the network connection including a sending bandwidth and a sending data queue size in order to determine sufficiency of the sending bandwidth in the "raw" mode, wherein the sending data queue size increasing relative to the sending bandwidth indicates a low bandwidth condition; and
upon detecting the low bandwidth condition in the network connection, toggling from the "raw" mode to a "saving" mode where audio data of the web conference is converted to text at a first end of the network connection, transmitted over the network connection as text, and converted from text back to audio data at a second end of the network connection.

2. The method of claim 1, wherein the "raw" mode and "saving" mode are implemented at an application layer of an Open System Interconnection (OSI) model.

3. The method of claim 1, wherein detecting the low bandwidth condition comprises determining whether the bandwidth of the network connection is sufficient to transmit content associated with the web conference.

4. The method of claim 1, wherein monitoring comprises monitoring in real time.

5. The method of claim 1, wherein a server resides at the first end of the network connection and a client resides at the second end of the network connection.

6. The method of claim 1, wherein a client resides at the first end of the network connection and a server resides at the second end of the network connection.

7. The method of claim 1, further comprising toggling from the "saving" mode to the "raw" mode in an event the low bandwidth condition is no longer detected on the network connection.

8. A computer program product for transmitting web-conference content over a network connection, the computer program product comprising a computer-readable storage medium having computer-usable program code embodied therein, the computer-usable program code configured to perform the following when executed by at least one processor:
conduct a web conference over a network connection;
implement, on the network connection, a "raw" mode wherein audio data of the web conference is transmitted over the network connection in an original format;
monitor characteristics of the network connection including a sending bandwidth and a sending data queue size in order to determine sufficiency of the sending bandwidth in the "raw" mode, wherein the sending data queue size increasing relative to the sending bandwidth indicates a low bandwidth condition; and
upon detecting the low bandwidth condition in the network connection, toggle from the "raw" mode to a "saving" mode where audio data of the web conference is converted to text at a first end of the network connection, transmitted over the network connection as text, and converted from text back to audio data at a second end of the network connection.

9. The computer program product of claim 8, wherein the "raw" mode and "saving" mode are implemented at an application layer of an Open System Interconnection (OSI) model.

10. The computer program product of claim 8, wherein detecting the low bandwidth condition comprises determining whether the bandwidth of the network connection is sufficient to transmit content associated with the web conference.

11. The computer program product of claim 8, wherein monitoring comprises monitoring in real time.

12. The computer program product of claim 8, wherein a server resides at the first end of the network connection and a client resides at the second end of the network connection.

13. The computer program product of claim 8, wherein a client resides at the first end of the network connection and a server resides at the second end of the network connection.

14. The computer program product of claim 8, wherein the computer-usable program code is further configured to toggle from the "saving" mode to the "raw" mode in an event the low bandwidth condition is no longer detected on the network connection.

15. A system for transmitting web-conference content over a network connection, the system comprising:
at least one processor;
at least one memory device operably coupled to the at least one processor and storing instructions for execution on the at least one processor, the instructions causing the at least one processor to:

conduct a web conference over a network connection;

implement, on the network connection, a "raw" mode wherein audio data of the web conference is transmitted over the network connection in an original format;

monitor characteristics of the network connection including a sending bandwidth and a sending data queue size in order to determine sufficiency of the sending bandwidth in the "raw" mode, wherein the sending data queue size increasing relative to the sending bandwidth indicates a low bandwidth condition; and upon detecting the low bandwidth condition in the network connection, toggle from the "raw" mode to a "saving" mode where audio data of the web conference is converted to text at a first end of the network connection, transmitted over the network connection as text, and converted from text back to audio data at a second end of the network connection.

16. The system of claim 15, wherein the "raw" mode and "saving" mode are implemented at an application layer of an Open System Interconnection (OSI) model.

17. The system of claim 15, wherein detecting the low bandwidth condition comprises determining whether the bandwidth of the network connection is sufficient to transmit content associated with the web conference.

18. The system of claim 15, wherein monitoring comprises monitoring in real time.

19. The system of claim 15, wherein a server resides at the first end of the network connection and a client resides at the second end of the network connection.

20. The system of claim 15, wherein a client resides at the first end of the network connection and a server resides at the second end of the network connection.

* * * * *